Figure 1:
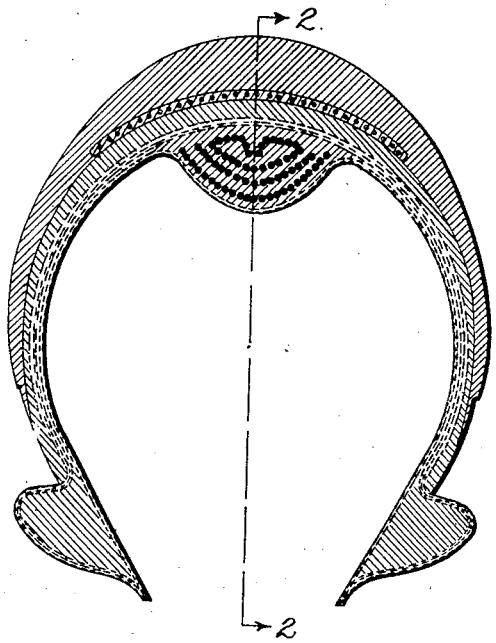

J. H. COURVOISIER.
PNEUMATIC TIRE.
APPLICATION FILED SEPT. 4, 1920.

1,386,599.

Patented Aug. 9, 1921.

Witnesses,
Edward L. Cole.
Roy E. Stephens

INVENTOR.
James H. Courvoisier

UNITED STATES PATENT OFFICE.

JAMES H. COURVOISIER, OF JOPLIN, MISSOURI.

PNEUMATIC TIRE.

1,386,599.     Specification of Letters Patent.     Patented Aug. 9, 1921.

Application filed September 4, 1920. Serial No. 408,406.

*To all whom it may concern:*

Be it known that I, JAMES H. COURVOISIER, a citizen of the United States, residing at Joplin, in the county of Jasper and State of Missouri, have invented certain new and useful Improvements in Pneumatic Tires, of which the following is a specification.

This invention relates to tires and it comprises a casing or shoe for pneumatic tires having the usual carcass formed of layers of fabric, or rubberized fabric, and an outer layer or casing of rubber, the fabric layers being separated at the crown of the tire to form a substantially inverted arch between the inner and outer layers of fabric, a core or filling of rubber or other suitable material arranged in said arch, and a plurality of strands or cords arranged in said core and extending circumferentially of the tire, the strands being positioned between the inner and outer layers of the fabric carcass to retain them in position.

In the present invention, I have produced a tire provided with reinforcing means arranged beneath the tread. The exterior of the casing is shaped in the usual manner, but the tread or crown of the tire is provided with additional thickness by forming certain sections of the fabric carcass in the form of an inverted arch at the crown of the tire. The space between these sections of the fabric carcass, and the remaining sections is filled with a suitable filler, such as rubber, and a plurality of reinforcing strands or cord are arranged therein.

In the prior art, it has been suggested to construct a tire having additional thickness at the tread or crown, the additional thickness being obtained by arching the fabric carcass inwardly toward the center of the tire, and tires constructed in this manner have been provided with circumferential reinforcing strands arranged in the rubber forming the tread of the tire. These tires have not been entirely satisfactory because no means have been provided for retaining the reinforcing strands in proper position. The strands embedded in rubber have a tendency to work or move and in actual practice, the reinforcing strands have creeped to one side to such an extent that the tire becomes overbalanced and will creep off the rim. If the reinforcing strands embedded in the tread portion of the tire are not properly centered when the tire is made, the tread will crack on being used.

In the present invention, I have overcome these disadvantages by separating the layers of fabric forming the carcass of the tire, and extending some of the layers around each side of the arch in the crown of the tire. The reinforcing strands are placed in a filler of rubber or other material arranged between the inner and outer layers of fabric, and the arrangement of the fabric entirely surrounding the arch, retains the strands in proper position.

Figure 2:
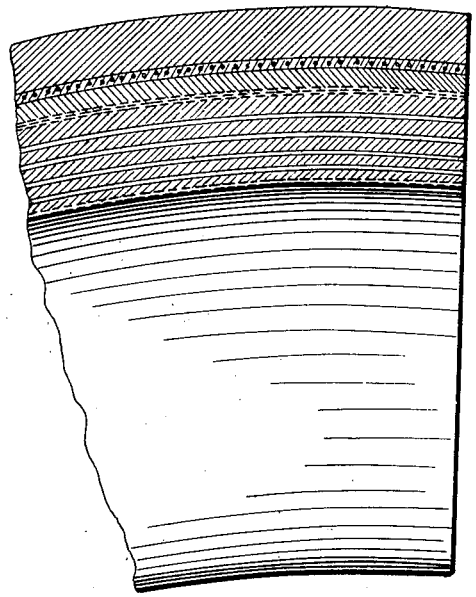

In the accompanying drawing, I have shown one embodiment of my invention. In this showing:

Figure 1 is a transverse vertical sectional view of a tire casing constructed in accordance with the invention, and, Fig. 2 is a sectional view on line 2—2 of Fig. 1.

Referring to the drawings, the reference numeral 1 designates the section of rubber forming the tread of the tire. This tread portion is disposed over a carcass 2, formed of a plurality of layers of fabric or cord or rubberized fabric or cord. The tire may be provided with the usual beads 3 and the fabric forming the carcass extended over the beads in the usual manner, as at 4. In the crown of the tire, the fabric is separated into an inner section 5 and an outer section 6. The outer section is arranged in the usual manner, but the inner section is extended inwardly toward the center of the tire to form an inverted arch. The arch, or space between the inner and outer sections of the tire carcass may be provided with a filling 7 of rubber or other suitable material. In actual practice, it has been found that rubber is the most suitable material for use as a filler in a tire of this sort, and lower grades of rubber than those usually employed in the outer tread of the tire, may advantageously be used.

A plurality of reinforcing strands 8 are embedded in this filler. The strands may be made of any suitable material, but are preferably inextensible and are of sufficient strength to reinforce the carcass portion of the tire. As shown, the strands extend circumferentially of the tire. The tire may be further provided with a breaker strip 9 arranged in the tread portion of the tire, as shown.

It will be apparent that the arrangement of the circumferential reinforcing strands in the inverted arch entirely surrounded by the fabric carcass will effectually retain them in position and prevent them from working to one side of the center of the tire. The present structure produces a tire of great strength and great durability.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A tire, comprising a plurality of layers of fabric and an outer casing of rubber, the inner layers of fabric being formed in the shape of an inverted arch at the crown of the tire, a filling of rubber arranged between the inner and outer layers of fabric and disposed in said arch, and a plurality of strands of cords embedded in said filling and arranged circumferentially of the tire, said strands being disposed in rows substantially parallel to each other and to the inner layers of fabric, and a second series of strands of cords embedded in said filling and arranged substantially parallel to the outer layers of fabric.

In testimony whereof I affix my signature in presence of two witnesses.

JAMES H. COURVOISIER.

Witnesses:
ROBERT W. MOORE,
MERCER ARNOLD.